United States Patent
Chrysanthos et al.

(10) Patent No.: US 12,339,653 B2
(45) Date of Patent: Jun. 24, 2025

(54) METHOD FOR PROCESSING FLIGHT DATA

(71) Applicants: SAFRAN ELECTRONICS & DEFENSE, Paris (FR); UNIVERSITE DE TECHNOLOGIE DE TROYES, Troyes (FR)

(72) Inventors: Nicolas Chrysanthos, Moissy-Cramayel (FR); Fabrice Ferrand, Moissy-Cramayel (FR); Pierre Jean Emile Beauseroy, Moissy-Cramayel (FR)

(73) Assignees: SAFRAN ELECTRONICS & DEFENSE, Paris (FR); UNIVERSITE DE TECHNOLOGIE DE COMPIEGNE, Compiegne (FR)

( * ) Notice: Subject to any disclaimer, the term of this patent is extended or adjusted under 35 U.S.C. 154(b) by 123 days.

(21) Appl. No.: 17/914,164

(22) PCT Filed: Mar. 23, 2021

(86) PCT No.: PCT/FR2021/050493
§ 371 (c)(1),
(2) Date: Sep. 23, 2022

(87) PCT Pub. No.: WO2021/191554
PCT Pub. Date: Sep. 30, 2021

(65) Prior Publication Data
US 2023/0127673 A1  Apr. 27, 2023

(30) Foreign Application Priority Data
Mar. 26, 2020 (FR) ..................................... 2002968

(51) Int. Cl.
*G05B 23/02* (2006.01)
*G06F 18/22* (2023.01)
(Continued)

(52) U.S. Cl.
CPC ......... *G05B 23/0237* (2013.01); *G06F 18/22* (2023.01); *G07C 5/008* (2013.01); *G07C 5/0808* (2013.01)

(58) Field of Classification Search
CPC ..... G05B 23/0237; G06F 18/22; G07C 5/008; G07C 5/0808
See application file for complete search history.

(56) References Cited

U.S. PATENT DOCUMENTS

2015/0324501 A1  11/2015  Desell et al.

FOREIGN PATENT DOCUMENTS

EP     3502920 A1   6/2019
FR     2987483 A1   8/2013

OTHER PUBLICATIONS

International Search Report dated Jun. 14, 2021 issued by the International Searching Authority in Application No. PCT/FR2021/050493.

(Continued)

*Primary Examiner* — Michael D Lang
(74) *Attorney, Agent, or Firm* — Sughrue Mion, PLLC

(57) ABSTRACT

A method for processing flight data having been recorded during three or more flights of an aircraft by a flight data recorder including obtaining two signature vectors with respective sizes, the two signature vectors corresponding to two different flights among the three or more flights, determining a similarity matrix, the components of which quantify the proximity between the two flight signature vectors, each component allowing identifying, for each element of a first signature, an element of the other signature which is closest, the proximity between two components of the signature vectors being a distance weighted by a mean value of the neighboring components of the similarity matrix, repeating the obtaining and determining in order to compare, (Continued)

two by two, all the flight signatures so as to obtain three or more similarity matrices, and processing said similarity matrices in order to evaluate the similarity between two flights.

7 Claims, 2 Drawing Sheets

(51) Int. Cl.
    *G07C 5/00*     (2006.01)
    *G07C 5/08*     (2006.01)

(56)     References Cited

OTHER PUBLICATIONS

Written Opinion dated Jun. 14, 2021 issued by the International Searching Authority in Application No. PCT/FR2021/050493.
French Search Report issued Nov. 13, 2020 in French Application No. 2002968.

METHOD FOR PROCESSING FLIGHT DATA

CROSS REFERENCE TO RELATED APPLICATIONS

This application is a National Stage of International Application No. PCT/FR2021/050493 filed Mar. 23, 2021, claiming priority based on French Patent Application No. 2002968 filed Mar. 26, 2020, the contents of each of which being herein incorporated by reference in their entireties.

GENERAL TECHNICAL FIELD

The invention relates to the analysis of flight data recorded during aircraft flight(s).

PRIOR ART

Regulation in terms of maintenance and aeronautical traffic defines standards which airlines are required to respect in order to ensure a maximum level of safety.

In order to optimize maintenance phases, the airlines are provided with flight data analysis systems.

Flight data analysis systems are known under the name FDM ("Flight Data Monitoring") or FOQA ("Flight Operational Quality Assurance"). These systems consist, among others, of equipping an aircraft with a flight data recorder. A recorder of this type is for example a black box or a specific recorder such as an ACMS ("Aircraft Condition Monitoring System").

These systems allow airlines to understand in detail the progress of a flight from regular recordings of the values of these flight data carried out during each flight of each of their aircraft.

To accomplish this, these systems compare several flights to one another by using an intermediate representation of flights called a signature. Each signature comprises a fixed number of descriptors intended to represent the information of interest of the flight in question. For this reason, reference can be made to document FR 2 987 483 which describes a method of analysis of flight data implementing such signatures.

The comparison of signatures to one another requires signatures of the same size, i.e. a fixed number of descriptors per flight. Yet often, two different flights have different durations and do not necessarily comprise the same descriptors. The comparison of these flights to one another is consequently made difficult and inaccurate, which impairs the analysis of the flights.

Presentation of the Invention

The invention proposes mitigating at least one of these disadvantages. To this end, the invention proposes a method for processing flight data having been recorded during at least three flights of at least one aircraft by means of a flight data recorder of an aircraft, the data being grouped by flight in a signature vector of the flight, the components of which correspond to data recorded during said flight of the aircraft, a flight being defined by a signature vector, the method comprising the following steps, implemented in a processing unit (20):

E2) obtaining two signature vectors x and y with respective size l and m, l≤m, the signature vectors corresponding to two different flights;

E3) determining a similarity matrix D the components D(i,j) of which quantify the proximity between the two flight signature vectors x and y, each component allowing identifying for each element of the signature x an element of the other signature y which is closest, the proximity between two components of the signatures x and y being a distance weighted by a mean value of the neighboring components of the similarity matrix;

E4) repeating steps E2) and E3) in order to compare, two by two, all the flight signatures so as to obtain at least three similarity matrices;

E5) processing said similarity matrices D in order to evaluate the similarity between two flights.

The invention is advantageously completed by the following characteristics, taken alone or in any one of their technically possible combinations.

The determination of the similarity matrix comprises the following steps

E31) initializing a matrix D having L rows and C columns, L=l+1 and C=m−l+2 columns;

E32) calculating $D(1,1)=|x_1-y_1|^2$ and for $(i,j)(i,j)\neq(1,1)$;

E33) calculating the elements $D[i,j]=|x_i-y_{i+j-1}|^2+A+B$;

with $$A = \frac{i-1}{(i+j-2)} \times D[i-1, j]; \text{ and}$$

$$B = \frac{j-1}{(i+j-2)} \times D[i, j-1];$$

$$i = 1, \ldots, l \text{ and } j = 1, \ldots, m-l+1.$$

The processing E5) comprises the following sub-steps: E51) decomposing into eigenvectors and eigenvalues each similarity matrix D; E52) determining an entropy coefficient for each eigenvalue; E53) selecting a subset of eigenvectors such that the sum of the entropies is greater than a fraction of the sum of the entropies; E54) determining for each signature, based on the selected eigenvalues, an abnormality score for the purpose of evaluating (E6) whether a flight is abnormal.

For each abnormal flight detected, a ghost flight is determined E7) that is closest to the abnormal flight detected which having an abnormality score such that the flight is normal.

The parameters of the abnormal flight detected are compared E8) to those of the ghost flight determined in order to detect at least one parameter of the abnormal flight which caused said detected abnormal flight to be abnormal.

The invention also relates to a computer program product comprising code instructions for the execution of a method according to the invention, when it is executed by a processor.

The advantages of the invention are multiple.

The invention allows comparing the set of time series data of two flights, and thus identifying problems more subtle that those which are manifested only by means of descriptors such as mean, maximum, etc.

The matrix obtained is a Gram matrix the components of which are easily interpreted because they translate to proximity. The notion of proximity is within the meaning of "closer according to the metric" or even a measurement of the distance defined in the vector space of the flight signatures. An analyst can therefore interpret this matrix.

Obtaining the matrix is rapid. In fact, to compare two signatures of respective sizes l≤m the invention requires a time on the order of l×(m−l) while most of the other methods for analyzing the signature require a time on the order of l×m. This is due to the fact that obtaining the matrix is on the basis of the shortest signature. Thus, in certain cases, the invention allows a processing time of several days to sometimes less than an hour to pass.

PRESENTATION OF THE FIGURES

Other features, objects and advantages of the invention will be revealed by the description that follows, which is purely illustrative and not limiting, and which must be read with reference to the appended drawings in which.

DETAILED DESCRIPTION

Figure 1:
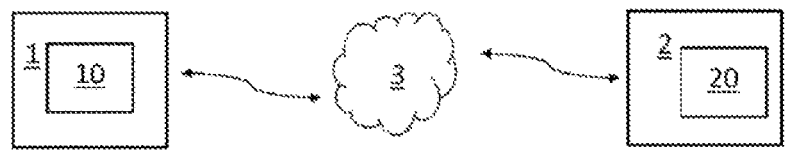
FIG. 1 illustrates an implementation architecture of the invention.
Figure 2:
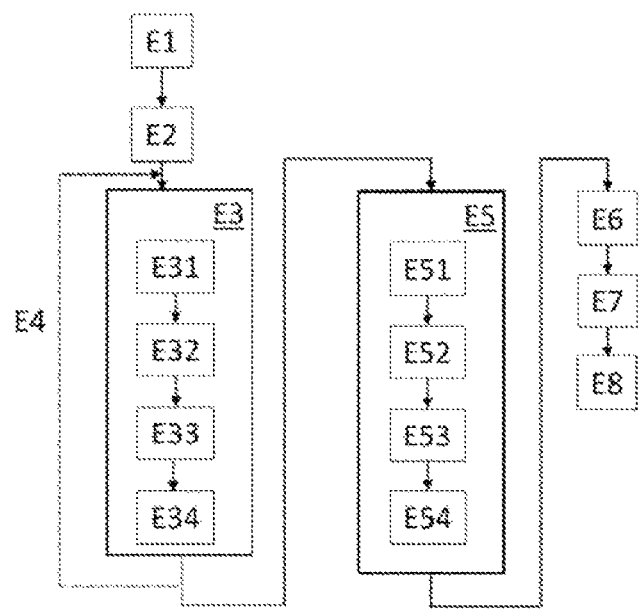
FIG. 2 illustrates the steps of a method for processing flight data according to the invention.

FIG. 1 illustrates an implementation architecture of the invention. A device 10 is carried on board an aircraft 1. A device 10 of this type allows the acquisition, the recording and the downloading of flight data originating in several sensors (not shown) arranged in the aircraft 1. The flight data are downloaded to a ground station 2 for the purpose of their analysis. The ground station 2 is in communication with the aircraft 1 by means of a network 3. The network 3 is a wireless or wired network. The ground station 2 comprises a processing unit 20 configured to implement a method for processing flight data which will be described hereafter in relation with FIG. 2.

A prerequisite for processing flight data, which is not detailed here, consist of recovering the flight data recorded during one or more flight(s) carried out by at least one aircraft.

These flight data correspond to flight parameters such as for example speed, altitude, temperature, etc.

For each flight, the data are grouped (step E1) into a flight signature. Each signature comprises a fixed number of parameters recorded over a flight duration. By way of an example, there can be as many as 2000 parameters recorded during a flight. At least three different flights are available.

To group the data in a flight signature, the data can be restricted to one flight phase (landing for example) and only a certain number of parameters can be retained. This allows shortening the size of the signatures.

Once the data are grouped, a set of flight signatures is available, each signature having its own size. Advantageously, in the method described here, the size of the signatures has no importance. Likewise, the signatures can be used directly without necessitating the normalization processing intended to mitigate the different orders of magnitude.

The signatures are advantageously treated two by two in two steps (steps E2) in order to obtain, for different pairs of signatures, a similarity matrix D (step E3). In the case of at least three flights, three similarity matrices are obtained.

The components of the similarity matrix D quantify the proximity between two flight signatures based on the shorter one. Each component has a similarity coefficient having a value comprised for example between 0 and 1.

In particular, each component of the matrix D allows identifying for an element of a signature an element of another signature which is closest.

Advantageously, it is a distance (or proximity) criterion between two elements which is evaluated, weighted by a mean value of the neighboring components of the calculated component.

Described hereafter is the method of obtaining the similarity matrix D.

Let x and y be the signatures of two flights. It is considered that the signature x has a size l and the signature y has a size m and that the signature x has a size smaller than or equal to the signature y. In fact, the longer signature will be compared with respect to the shorter signature.

First the matrix D is initialized (step E31) and advantageously has L rows and C columns. Preferably L=l+1 and C=m−l+2 columns.

Then the component D(1,1) is initialized to the value $D(1,1)=|x_1-y_1|^2$ (step E32). Then the other components are calculated as follows (step E33):

for $(i,j) \neq (1,1) D[i,j]=|x_i-y_{i+j-1}|^2+A[i,j]+B[i,j]$, with $$A[i, j] = \frac{i-1}{(i+j-2)} \times D[i-1, j] \text{ and } B[i, j] = \frac{j-1}{(i+j-2)} \times D[i, j-1],$$

$$i = 1, \ldots, l \text{ and } j = 1, \ldots, m-l+1.$$

The values A and B are the means of the components near the value of the component calculated. This weighting allows having values of the similarity coefficient which translate into a more general similarity form than considering only the Euclidean distance.

The matrix obtained is not square, therefore it is reduced to a square matrix of size l×l (step E34) because the benchmark is the shortest sequence.

The reduction consists of retaining on the rows and columns only the first l elements.

Steps E31, E32, E33, E34 are repeated (step E4) in order to compare, two by two, all the flight signatures available.

Below is described the method of obtaining the similarity matrix D in the form of an algorithm.

```
D ← matrice (0..l, 0..(m − l + 1))
for i ← 1 to l do
    D[i, 0] ← 0
end for
for j ← 1 to m − l + 1 do
    D[0, j] ← 0
end for
D[1, 1] ← |x_1 − y_1|²
for i ← 1 to l do
    for j ← 1 to m − l + 1 do
        if (i, j) ≠ (1, 1) then
            A ← (i − 1)/(i + j − 2) × D[i − 1, j]
            B ← (j − 1)/(i + j − 2) × D[i, j − 1]
            D[i, j] ← |x_i − y_{i+j-1}|² + A + B
        end if
    end for
end for
```

Figure 3:
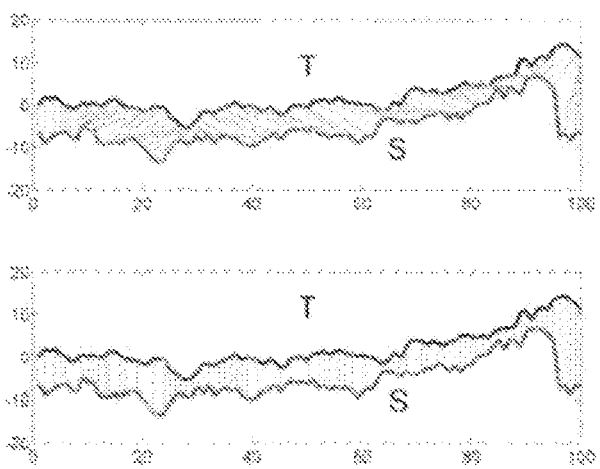
FIG. 3 illustrates the principle of alignment of two signatures translated by the similarity matrix obtained during the method according to the invention.

The similarity matrix D advantageously allows re-aligning two signatures x and y. In fact, it is possible to extract the indices to best identify which are the closest elements. Illustrated in FIG. 3 is the principle of alignment of two signatures translated by the similarity matrix. The upper curve shows two signatures T and S aligned by using the similarity coefficients of the matrix obtained. The lines between the two curves translate the correspondence between the elements of the signatures. A line connects the two elements of each signature which have been identified as being the most similar (lowest similarity coefficient on each column of the matrix). It is noted, still on the lower curve, that the lines are first vertical because the first components of the matrix are not accurate and do not take into account the mean of the neighboring components. Thus, the first vertical lines consider only the Euclidean distance. This is all the more visible when considering the lower curve, which considers only the Euclidean distance. In the lower figure there are only vertical lines. Thus, with similarity matrix, two signatures are aligned by maximizing similarity. The principle exposed here is inspired by the principle known under the name "Dynamic Time Warping" (DTW).

The alignment disclosed here is different from a conventional alignment used to temporally align two signatures which do not have the same duration. In fact, conventionally it is a matter of slowing or accelerating the time of one or the other of the two signatures: mathematically, slowing the time corresponds to repeating one or more elements of the signature, while accelerating the time comes down to eliminating one or more elements while retaining the time order of the elements of each of the signatures.

Once all the signatures have been compared, i.e. the set of K matrices D is obtained, the latter are processed (step E5) in order to evaluate the abnormality of a flight.

In particular, each matrix is decomposed into eigenvectors and eigenvalues (step E51). Denoted $a_1^k, \ldots, a_l^k$ are the eigenvectors and $\lambda_1^k, \ldots, \lambda_l^k$ the eigenvectors of the matrix $D_k$, $k=1, \ldots, K$.

Based on these eigenvectors and eigenvalues, an entropy coefficient is determined for each eigenvector (step E52) defined by $$\forall i = 1, \ldots l \; \gamma_i = \frac{\lambda_i \cdot \left(\sum_{j=1}^N \alpha_{i,j}\right)}{l^2}.$$

For the sake of ease of reading, the indices k have been eliminated from the notations for the eigenvalues, the eigenvectors and the entropy, but it must be understood that the calculated values are calculated for each of the similarity matrices.

The entropy coefficients are a relevant criterion allowing selecting only the most relevant data for all the signatures of all the flights.

In particular, a subset of eigenvectors $\{a_m\}_{m \in \{1, \ldots, N\}}$ is selected (step E53) such that the sum of the corresponding entropies $\gamma_m$ is greater than a fraction (or percentage) of the sum of the l entropies $\gamma_i$.

Preferably, the percentage is comprised between 75 and 95%, preferably 90%.

Then, for each signature (or flight) an abnormality score is determined (step E54)

The abnormality score is defined for a signature by $$z_k = 1 - \sum_{u \in m} \frac{(D_i^T \alpha_u)^2}{\lambda_u}$$

with $a_u$ the selected eigenvectors and $\lambda_u$ their associated eigenvalues.

The abnormality score is comprised between 0 and 1. The closer the score is to 1, the more abnormal the flight is judged to be.

Consequently it is possible to detect (step E6), depending on the abnormality score $z_i$, whether at least one flight is abnormal.

The abnormality score can be displayed to be viewed by an analyst.

If an abnormal flight is detected, a nominal reference flight called a "ghost flight" can be determined (step E7) for the latter, which is closest to this detected abnormal flight while having an abnormality score which causes the flight to be normal. The ghost flight can naturally be different from a flight of which the signature is available.

Then, the parameters of the detected abnormal flight are compared to those of the ghost flight in order to detect at least one flight parameter which caused the detected abnormal flight to be abnormal (step E8).

The ghost flight is generated via a nonlinear constrained optimization procedure of a known type.

The invention claimed is:

1. A computer implemented method for processing flight data, the computer implemented method comprising:

E1) receiving from a flight data recorder of an aircraft, flight data recorded during at least three flights of at least one aircraft by means of the flight data recorder, the data being grouped by flight in a signature vector of the flight, the components of which correspond to data recorded during said flight of the aircraft, a flight being defined by a signature vector, E2) obtaining two signature vectors x and y with respective size l and m, l≤m, the two signature vectors corresponding to two different flights among said at least three flights;

E3) determining a similarity matrix D the components D (i,j) of which quantify the proximity between the two flight signature vectors x and y, each component allowing identifying for each element of the signature x an element of the other signature y which is closest, the proximity between two components of the signature vectors x and y being a distance weighted by a mean value of the neighboring components of the similarity matrix, wherein determining the similarity matrix comprises:

E31) initializing a matrix D having L rows and C columns, L=l+1 and C=m−l+2 columns;

E32) calculating $D(1,1)=|x_1-y_1|^2$ and for $(i,j)(i,j) \neq (1,1)$;

E33) calculating the elements $D[i,j]=|x_i-y_{i+j-1}|^2+A+B$;

with $$A = \frac{i-1}{(i+j-2)} \times D[i-1, j]; \text{ and}$$

$$B = \frac{j-1}{(i+j-2)} \times D[i, j-1];$$

$i = 1, \ldots, l$ and $j = 1, \ldots, m-l+1;$

E4) repeating steps E2) and E3) in order to compare, two by two, all the flight signatures so as to obtain at least three similarity matrices; and E5) processing said similarity matrices D in order to evaluate the similarity between two flights.

2. The method according claim 1, wherein the processing E5) comprises the following sub-steps:

E51) decomposing into eigenvectors and eigenvalues each similarity matrix D;

E52) determining an entropy coefficient for each eigenvalue;

E53) selecting a subset of eigenvectors such that the sum of the entropies is greater than a fraction of the sum of the entropies;

E54) determining for each signature, based on the selected eigenvectors, an abnormality score for the purpose of evaluating whether a flight is abnormal.

3. The method according to claim 2, wherein for each abnormal flight detected, a ghost flight is determined that is closest to the abnormal flight detected which having an abnormality score such that the flight is normal.

4. The method according to claim 3, wherein the parameters of the abnormal flight detected are compared to those of the ghost flight determined in order to detect at least one parameter of the abnormal flight which caused said detected abnormal flight to be abnormal.

5. The method according to claim 4, further comprising displaying the abnormal flight.

6. A non-transitory computer program product comprising code instructions which, when executed by a processor, cause the processor to perform the method according to claim 1.

7. A system for processing flight data comprising:
- a flight data recorder of an aircraft located on an aircraft, the flight data recorder being configured for acquiring flight data during a flight of an aircraft; and
- a ground station in communication with the flight data recorder, the ground station comprising a processor that implements the method as claimed in claim 1.

* * * * *